United States Patent Office 2,767,145
Patented Oct. 16, 1956

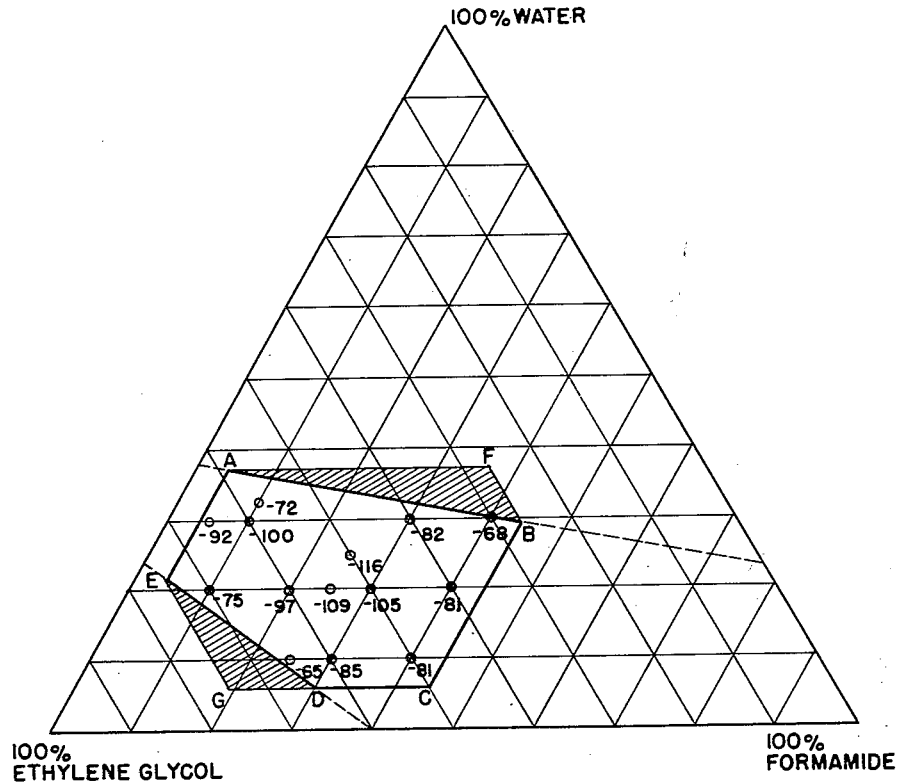
FIG. I
GEORGE E. BARKER,
*INVENTOR.*

2,767,145

LOW FREEZING LIQUID

George E. Barker, Llangollen Estates, Del., assignor to Atlas Powder Company, Wilmington, Del., a corporation of Delaware Application January 29, 1954, Serial No. 407,109

3 Claims. (Cl. 252—77)

This invention relates to liquid compositions of low freezing point, and particularly to low freezing liquids which are also of low flammability.

It is an object of the invention to provide novel liquid compositions of low freezing point.

Another object is to provide compositions which retain high fluidity at low temperatures.

A further object is to provide low freezing liquids of low flammability.

The above and other objects will become more apparent in the course of the following description and the appended claims.

The novel compositions of the invention comprise three essential ingredients, namely, ethylene glycol, water and formamide. The use of glycol-water mixtures as low freezing liquids in coolants for automobile engines, as heat exchanging media in refrigeration, as base liquids for hydraulic fluids, and the like, is well known. The lowest freezing point which may be obtained in the glycol-water system is appproximately −65° F., in a mixture containing about 65% glycol and 35% water.

In accordance with the present invention compositions ranging in freezing point downward from −65°F. are provided. In addition to ethylene glycol and water the compositions of the invention contain formamide. Proportions of the three components may be expressed by employing the conventional equilateral triangular graph for representing the percentage compositions of three component systems. The low freezing liquids of the invention are those having compositions falling within the irregular pentagon ABCDE of Figure 1, wherein the vertices of the pentagon angles are fixed by co-ordinates A to E as tabulated in Table I below. It can be seen from the figure that the percentage ranges of the several ingredients lie within the following inclusive limits:

Percent
Ethylene glycol _____ 26.6 to 74.4
Formamide _____ 4 to 44
Water _____ 6 to 37.2

Liquids defined by the above percentage limitations include all compositions falling within the hexagon AFBCGE of Figure 1, the vertices of which are fixed by the appropriate coordinates listed in Table I.

TABLE I

Co-ordinates of the vertices of polygons in Figure 1

| Point | Percent Glycol | Percent Formamide | Percent Water |
|---|---|---|---|
| A | 58.8 | 4 | 37.2 |
| B | 26.6 | 44 | 29.4 |
| C | 50 | 44 | 6 |
| D | 64 | 30 | 6 |
| E | 74.4 | 4 | 21.6 |
| F | 26.6 | 36.2 | 37.2 |
| G | 74.4 | 19.6 | 6 |

To define the liquids of the invention it is necessary to exclude those having compositions falling within the triangular areas ABF and EDG. By extending lines AB and ED to the base lines of the graph, reference points are obtained which can be used to exclude the said areas. Every composition between the extended lines, and no other composition, is capable of being prepared by mixing an aqueous glycol solution containing from 62% to 76% glycol with a liquid selected from the group consisting of formamide, aqueous formamide solutions containing at least 77% formamide, and glycol-formamide solutions containing at least 40% formamide. Any composition of the invention, then, may be defined as a ternary liquid of low freezing point, having a composition identical with that obtainable by mixing an aqueous ethylene glycol solution containing from 62 % to 76% glycol with a liquid selected from the group consisting of formamide, aqueous solutions of formamide containing at least 77% formamide and ethylene glycol solutions of formamide containing at least 40% formamide, in proportions such that the said ternary liquid contains at least 6% water and from 4% to 44% formamide.

It is to be understood that in defining the compositions of the invention in terms of binary mixtures from which they may be produced no limitations on their method of production is imposed. The compositions of the invention, i. e., any composition lying within the pentagon ABCDE, may be prepared by mixing the indicated proportions of the three components in any order.

Preferred compositions within the group so defined are those falling within the following tabulated limits:

Percent
Ethylene glycol _____ 42 to 62
Formamide _____ 12 to 36
Water _____ 12 to 26

Fluids within this preferred range of compositions have freezing points ranging downward from −95° F.

The compositions of the invention are useful by themselves as heat exchanging media at sub-zero temperatures. They may be employed as radiator coolants in internal combustion engines which are exposed between periods of operation to arctic conditions. Corrosion inhibitors may be added to minimize attack of metal parts. Suitable corrosion inhibitors include organic amines, inorganic and organic nitrites, benzoates, sodium mercaptobenzothiazole, and the like.

By the addition of suitable thickening agents and/or viscosity index modifiers the ternary liquids of the invention may be converted into excellent hydraulic fluids which do not freeze except at extremely low temperatures. Such fluids are thus suited as the pressure transmitting fluid in aircraft equipment which may encounter very low temperature operating conditions at high altitudes. The compositions of the invention are, moreover, of very low flammability rendering them of particular value in hydraulic and cooling systems where the risk of fire is a recognized hazard. Hydraulic fluids so prepared may be modified by the addition of known corrosion inhibitors and lubricants.

Specific compositions coming within the purview of the invention are presented in Table II and are plotted on Figure 1. The components may be mixed in any order since the three ingredients are liquid at room temperature and are mutually soluble.

TABLE II

*Ternary low-freezing compositions*

| Example No. | Percentage composition | | | Freezing Point, °F. |
|---|---|---|---|---|
| | Ethylene Glycol | Formamide | Water | |
| 1 [1] | 50 | 30 | 20 | −105 |
| 2 [1] | 60 | 20 | 20 | −97 |
| 3 | 60 | 30 | 10 | −85 |
| 4 | 65 | 5 | 30 | −92 |
| 5 | 30 | 40 | 30 | −68 |
| 6 | 40 | 40 | 20 | −81 |
| 7 | 50 | 40 | 10 | −81 |
| 8 | 60 | 10 | 30 | −100 |
| 9 | 65 | 25 | 10 | −65 |
| 10 | 40 | 30 | 30 | −82 |
| 11 | 55 | 10 | 35 | −72 |
| 12 | 70 | 10 | 20 | −75 |
| 13 [1] | 50 | 25 | 25 | −116 |
| 14 [1] | 55 | 25 | 20 | −109 |

[1] Preferred compositions.

Liquid compositions containing as a basis ternary compositions as above defined and exemplified may be modified by the addition of corrosion inhibitors, stabilizers, viscosity index modifiers, thickeners, lubricants, and the like, for special purposes. Thus conventional viscosity index modifiers such, for example, as polyoxyalkylene esters of tall oil, polyoxyethylene esters of dimerized unsaturated fatty acids, higher mixed polyoxyethylene-polyoxypropylene glycols, or ethers of such mixed glycols are miscible with the compositions of the invention and when incorporated therein produce hydraulic fluids of superior quality. Specific examples of hydraulic fluids based on the ternary liquid compositions of the invention include the following:

EXAMPLE 15

Ten parts by weight of a mixed polyoxyethylene-polyoxypropylene glycol, available commercially under the trade name UCON H660, was dissolved in 90 parts by weight of the composition of Example 5 above. The resulting solution had a freezing point of −90° F. and kinematic viscosity of 1.8 centistokes at 130° F. Its viscosity at −65° F. was 388 centistokes. If, instead of UCON H660, 10 parts of the polyoxyethylene ester of dimerized linoleic acid containing 24 oxyethylene groups per mol is employed, the respective viscosities at 130° F. and −65° F. are 73 centistokes and 453 centistokes.

EXAMPLE 16

Ten parts of the polyoxyethylene ester of dimerized linoleic acid of Example 15 dissolved in the ternary composition of Example 6 produces a fluid of viscosity 6.4 centistokes at 130° F. and 946 centistokes at −65° F.

The foregoing examples are illustrative but are not to be considered as limiting the invention. Many apparently different embodiments may be made without departing from the spirit and scope of the invention.

What is claimed is:

1. A low-freezing liquid comprising a ternary composition of from 42% to 62% ethylene glycol, from 12% to 36% formamide and from 12% to 26% water, all percentages being by weight.

2. A low-freezing liquid comprising a ternary composition consisting of 50% ethylene glycol, 25% formamide and 25% water, all percentages being by weight.

3. A low freezing liquid comprising a ternary composition of ethylene glycol, formamide and water defined by the irregular pentagon ABCDE of the drawing wherein the vertices of the pentagon angles are fixed by the following co-ordinates:

| Point | Percent Glycol | Percent Formamide | Percent Water |
|---|---|---|---|
| A | 58.8 | 4 | 37.2 |
| B | 26.6 | 44 | 29.4 |
| C | 50 | 44 | 6 |
| D | 64 | 30 | 6 |
| E | 74.4 | 4 | 21.6 |

References Cited in the file of this patent

UNITED STATES PATENTS

| 1,687,094 | Iserman | Oct. 9, 1928 |
| 2,308,246 | Polin et al. | Jan. 12, 1943 |